United States Patent
Sasaki et al.

(10) Patent No.: US 11,584,331 B2
(45) Date of Patent: Feb. 21, 2023

(54) HINGE FOR A VEHICLE HOOD

(71) Applicant: HONDA MOTOR CO., LTD., Tokyo (JP)

(72) Inventors: Kazutada Sasaki, Wako (JP); Chisato Suetsugu, Wako (JP); Shin Saeki, Wako (JP); Thomas Wood, Penetanguishene (CA)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 17/208,133

(22) Filed: Mar. 22, 2021

(65) Prior Publication Data
US 2021/0300295 A1    Sep. 30, 2021

(30) Foreign Application Priority Data

Mar. 26, 2020 (JP) .............................. JP2020-056906

(51) Int. Cl.
| | |
|---|---|
| B60R 21/38 | (2011.01) |
| B62D 25/12 | (2006.01) |
| E05D 3/02 | (2006.01) |

(52) U.S. Cl.
CPC .............. B60R 21/38 (2013.01); B62D 25/12 (2013.01); E05D 3/02 (2013.01); E05Y 2201/22 (2013.01); E05Y 2201/224 (2013.01); E05Y 2900/536 (2013.01)

(58) Field of Classification Search
CPC ........... B60R 21/38; B62D 25/12; E05D 3/02; E05D 15/48; E05D 7/00; E05D 11/00; E05Y 2201/22; E05Y 2201/224; E05Y 2900/536
See application file for complete search history.

(56) References Cited

U.S. PATENT DOCUMENTS

| | | | |
|---|---|---|---|
| 2007/0074919 A1 | 4/2007 | Hirata | |
| 2014/0182962 A1* | 7/2014 | McIntyre, I | B60R 21/38 180/274 |
| 2017/0282847 A1* | 10/2017 | Jenny | B60R 21/36 |
| 2019/0241150 A1* | 8/2019 | Fredriksson | B60R 21/38 |
| 2019/0368224 A1* | 12/2019 | Weichsel | E05B 17/0037 |
| 2019/0375369 A1* | 12/2019 | Hufen | B60R 21/38 |
| 2019/0383074 A1* | 12/2019 | Schabenberger | E05D 3/145 |

FOREIGN PATENT DOCUMENTS

JP    2007-062487 A    3/2007

* cited by examiner

Primary Examiner — Paul N Dickson
Assistant Examiner — Matthew Joseph Ganci
(74) Attorney, Agent, or Firm — Rankin, Hill & Clark LLP (57) ABSTRACT

A hinge for a vehicle hood is provided. The hinge includes a hinge lower fixed to a vehicle body, and a hinge upper fixed to the hood and rotatably supported relative to the hinge lower. The hinge upper includes a first member rotatably supported relative to the hinge lower, and a second member fixed to the hood and relatively movable relative to the first member. The hinge further includes a first lock configured to be engageable with the first member to restrict rotation of the first member relative to the hinge lower. The first member and the second member are integrally rotatable relative to the hinge lower in a normal operation of opening and closing the hood. When the hood is caused to pop up, the first lock engages with the first member and the second member is relatively movable relative to the first member.

4 Claims, 10 Drawing Sheets

HINGE FOR A VEHICLE HOOD

CROSS-REFERENCE TO RELATED APPLICATION

This application claims the benefit of foreign priority to Japanese Patent Application No. 2020-056906, filed on Mar. 26, 2020, which is incorporated by reference in its entirety.

TECHNICAL FIELD

The present invention relates to a hinge for a hood of a vehicle, which enables a normally opening operation of the hood and a pop-up operation of the hood.

BACKGROUND

Japanese Patent Laid-open Publication No. 2007-062487 discloses a structure of a hinge for a vehicle hood, in which a hinge upper includes a linkage member and a fixed member fixed to a hood. According to this structure, the linkage member and the fixed member are integrally rotatable relative to a hinge lower in the normally opening operation of the vehicle hood, whereas in the pop-up operation of the vehicle hood, the linkage member is rotatable relative to the hinge lower and the fixed member and the food are rotatable together relative to the linkage member.

According to this structure disclosed in JP 2007-062487 A, a large force is required in the pop-up operation because the linkage member and the fixed member are popped up together with the hood.

In view of the above, the present invention seeks to provide a hinge for a vehicle hood, which can suppress the weight of movable members to be moved in the pop-up operation.

SUMMARY

To address the above problem, one aspect of the present invention provides a hinge for a hood of a vehicle, the hinge comprising: a hinge lower fixed to a vehicle body; and a hinge upper fixed to the hood and configured to be rotatably supported relative to the hinge lower. The hinge upper comprises: a first member rotatably supported relative to the hinge lower; and a second member fixed to the hood and configured to be supported so as to be relatively movable relative to the first member. Further, the hinge comprises a first lock configured to be engageable with the first member to restrict rotation of the first member relative to the hinge lower. The first member and the second member are integrally rotatable relative to the hinge lower in a normal operation of opening and closing the hood, whereas when the hood is caused to pop up, the first lock engages with the first member and the second member is relatively movable relative to the first member.

BRIEF DESCRIPTION OF THE DRAWINGS

The drawings described herein are for illustration purposes only and are not intended to limit the scope of the present invention in any way.

DETAILED DESCRIPTION

One embodiment of the present invention will be described in detail with reference to the accompanying drawings where appropriate. In the drawings, front and rear directions refer to corresponding directions in the longitudinal direction (i.e., front-rear direction) of a vehicle, right and left directions refer to corresponding directions in the vehicle width direction (i.e., lateral direction or right-left direction) of the vehicle as viewed from a driver's seat, and upper and lower directions refer to corresponding directions in the vertical direction (i.e., upper-lower direction) of the vehicle when a hinge is mounted on a horizontal plane of the vehicle.

Figure 1:
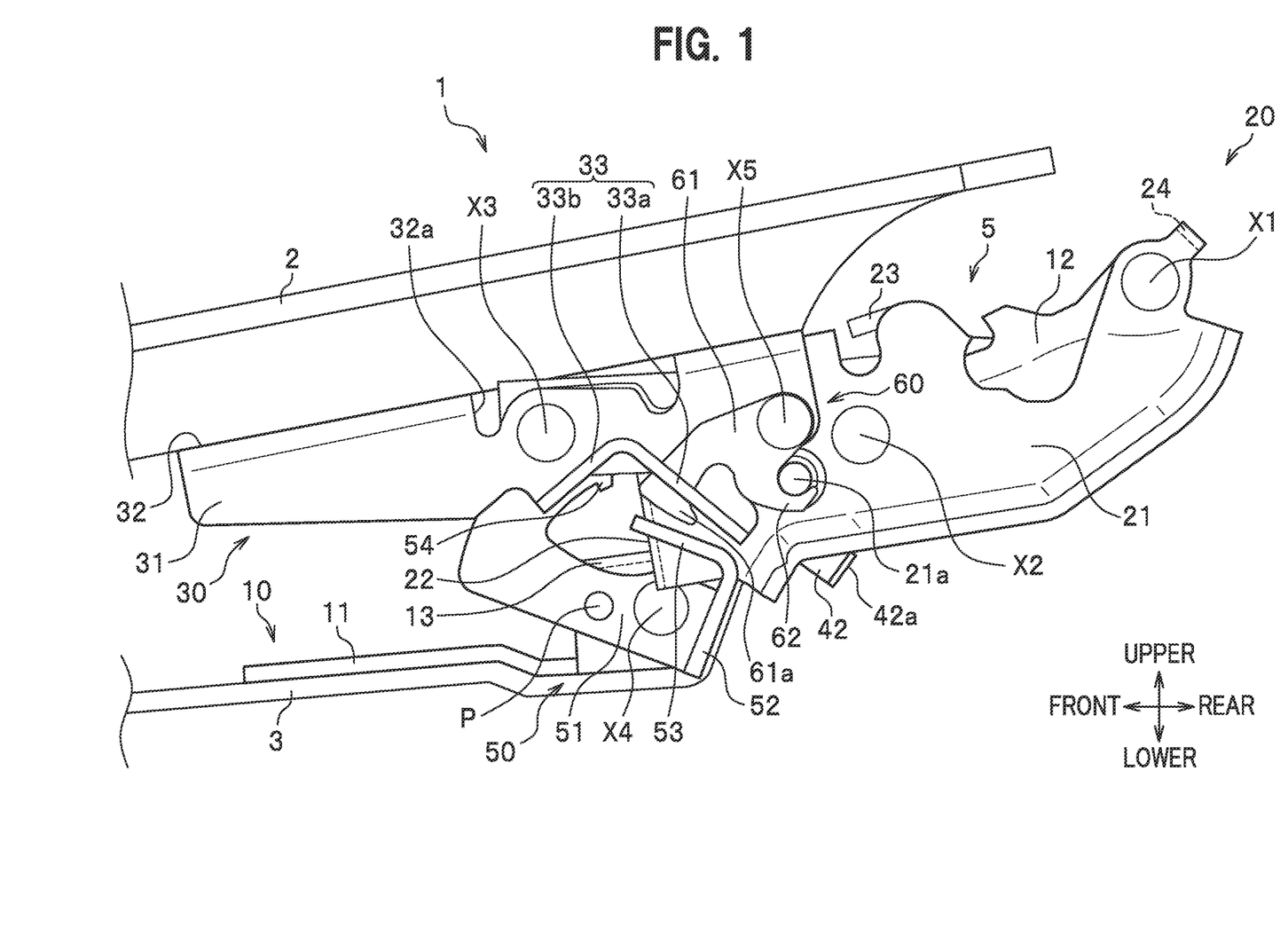
FIG. 1 is a side view schematically showing a hinge for a hood of a vehicle according to one embodiment of the present invention.
Figure 2:
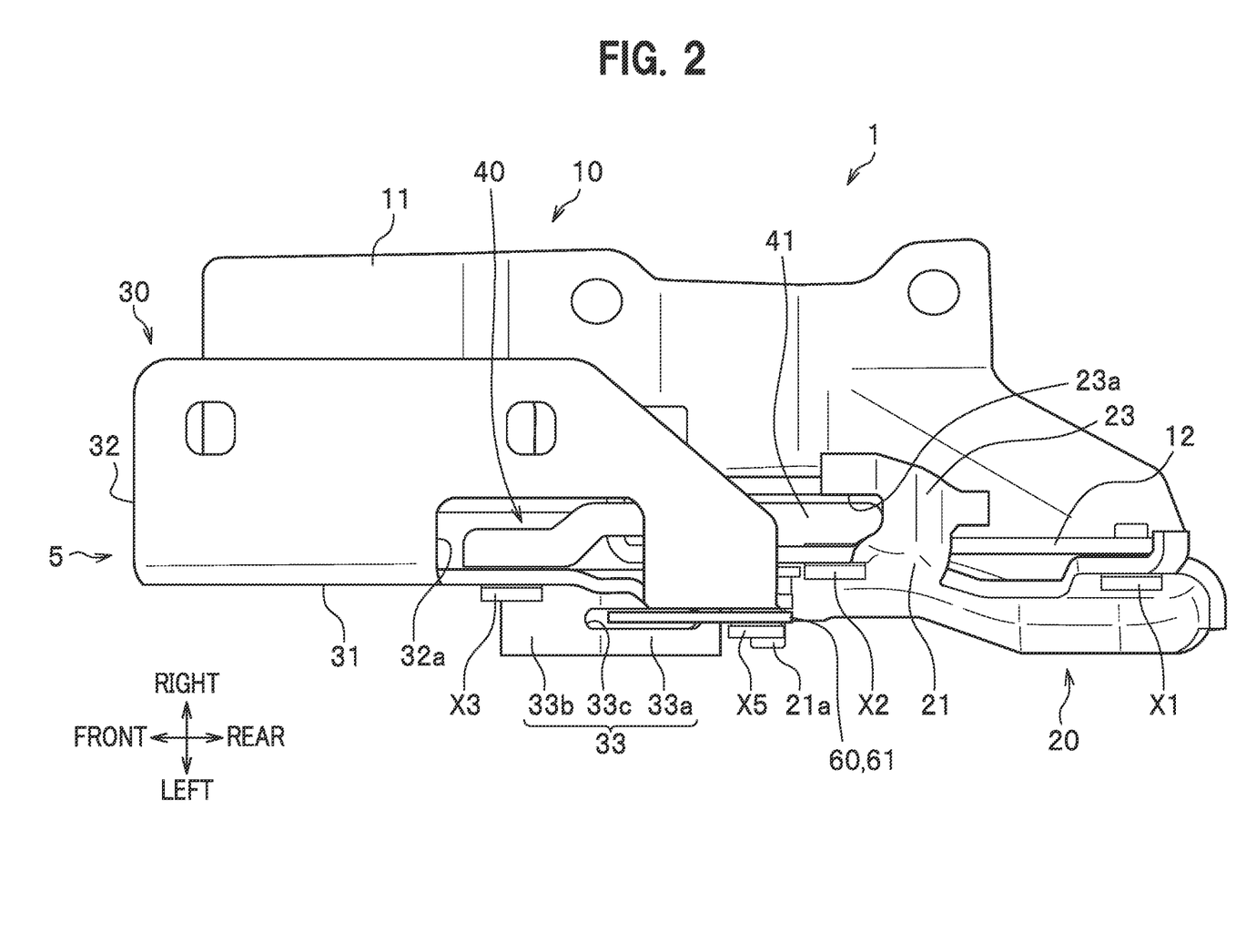
FIG. 2 is a top view schematically showing the hinge.
Figure 3:
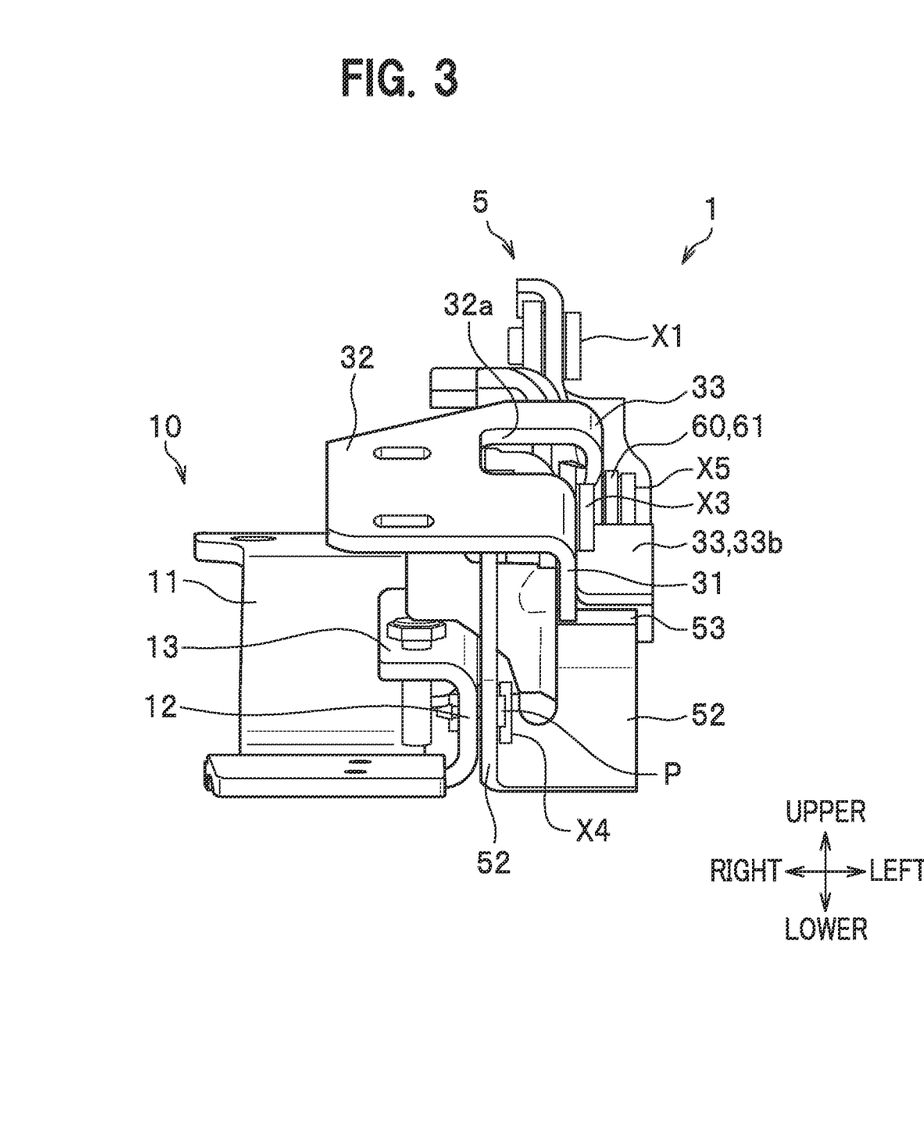
FIG. 3 is a front view schematically showing the hinge.

As seen in FIGS. 1 to 3, a hinge for a hood of a vehicle (hereinafter also referred to as a vehicle hood hinge) 1 according to one embodiment of the present invention is a component for rotatably supporting one end portion (rear end portion in this embodiment) of a hood 2 relative to a vehicle body (e.g., upper member) 3 to open and close the hood 2. The hood 2 is a hinged cover made of metal or resin for opening and closing an upper opening of a vehicle compartment (e.g., engine room or motor room) located at a front side of the vehicle body 3. According to this embodiment, a pair of right and left hinges 1, 1 are provided on both lateral end portions of the hood 2 in the vehicle width direction. In the following description, the left hinge 1 is described by way of example, and the description is made with a closed state thereof as a reference.

The hinge 1 serves as an axis of rotation on one end portion (rear end portion) of the hood 2 when the hood 2 is normally opened in a normally opening operation of the hood 2. Whereas when the hood 2 is caused to pop up in a pop-up operation of the hood 2, the hinge 1 lifts the one end portion (rear end portion) of the hood 2 by an elongating motion of an actuator 4 (see FIG. 5) provided in the vehicle body 3.

It should be noted that a latch (not shown) for the hood 2 of the vehicle is provided on the other end portion (front end portion) of the hood 2. The latch is in an unlocked state during the normally opening operation. During the pop-up operation of the hood 2, the latch is kept in a locked state and lifts the other end portion (front end portion) of the hood 2.

The hinge 1 includes a hinge lower 10, a hinge upper 5, a first lock 50, and a second lock 60.

<Hinge Lower>

The hinge lower 10 is a metal member fixed to the vehicle body 3. The hinge lower 10 integrally includes a bottom wall portion 11 as an attachment portion, an outer wall portion 12 extending upward from a laterally outer end portion of a rear portion of the bottom wall portion 11 and constituting a main part of the hinge lower 10, and an upper wall portion 13 extending inward in the vehicle width direction from an upper end portion of a front end portion of the outer wall portion 12.

The bottom wall portion 11 is fixed to an upper surface of the vehicle body 3, for example, by tightening bolts. A first member 20 of the hinge upper 5 is rotatably connected to one end portion (rear end portion) of the outer wall portion 12 through an axis of rotation X1 extending in the vehicle width direction.

<Hinge Upper>

The hinge upper 5 is a metal member fixed to the hood 2 and configured to be rotatably supported relative to the hinge lower 10. The hinge upper 5 is provided on a laterally outer side of the outer wall portion 12 of the hinge lower 10. The hinge upper 5 includes a first member (hinge upper rear) 20, a second member (hinge upper front) 30, and a linkage member 40.

<First Member>

The first member 20 integrally includes a side wall portion 21 constituting a main part of the first member 20, a front wall portion 22 extending inward in the vehicle width direction from the other end portion (front end portion) of the side wall portion 21, an upper wall portion 23 extending inward in the vehicle width direction from an upper end portion of a longitudinally middle portion of the side wall portion 21, and a rear wall portion 24 extending inward in the vehicle width direction from the one end portion (rear end portion) of the side wall portion 21.

Figure 8:
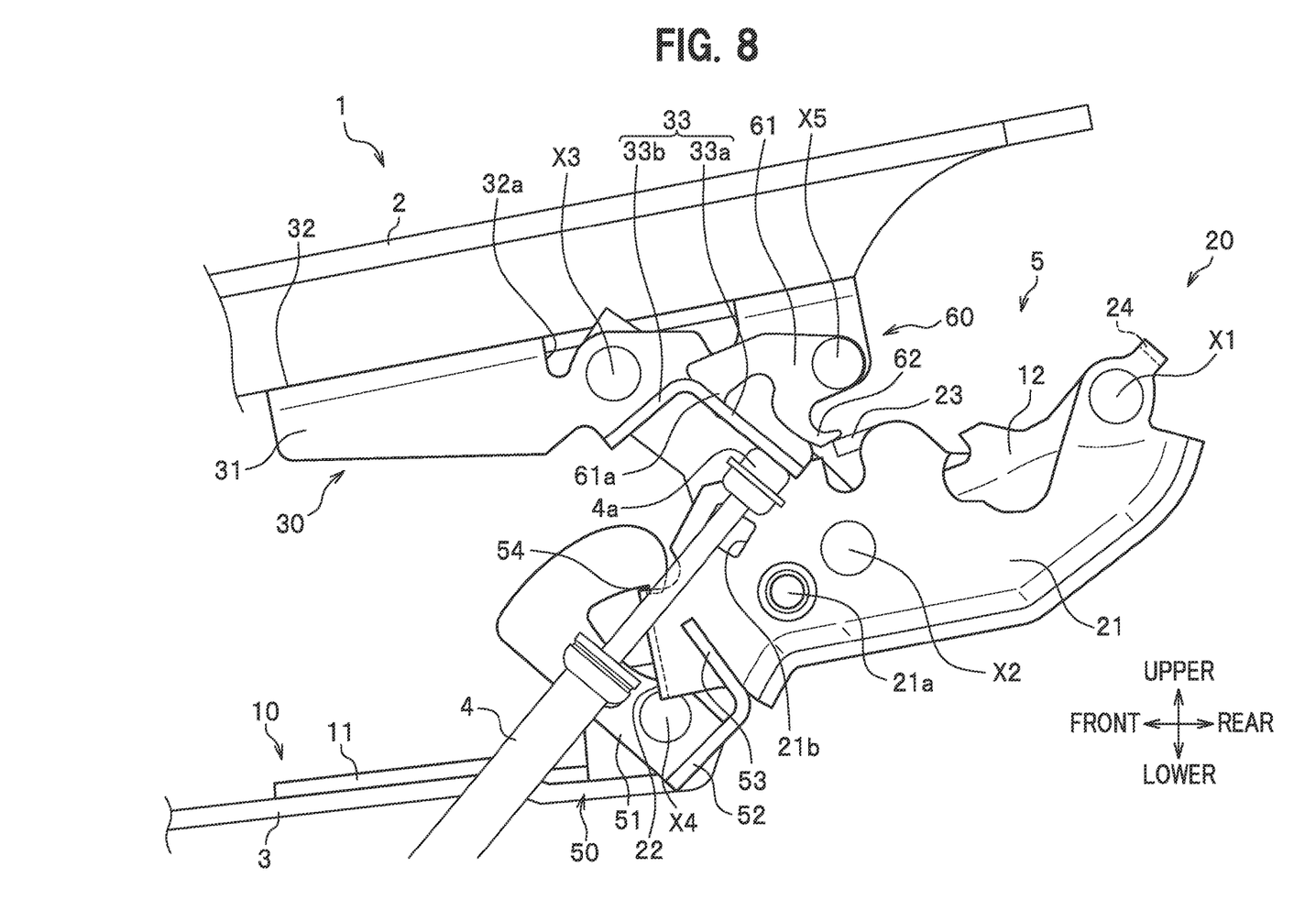
FIG. 8 is a side view explaining motion of the hinge, in which an upward motion of the second member in the pop-up operation is schematically shown.
Figure 9:
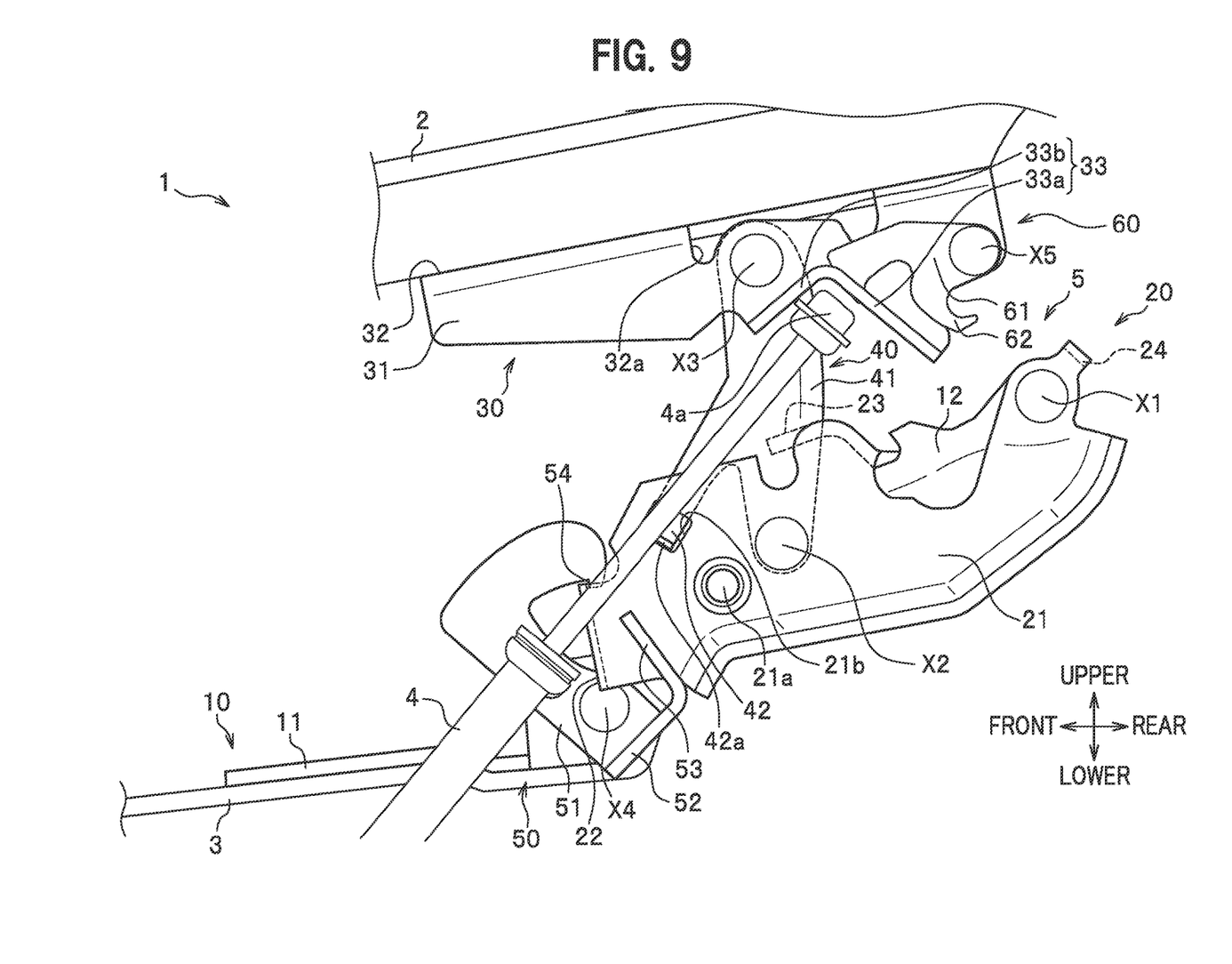
FIG. 9 is a side view explaining motion of the hinge, in which a locking motion of a linkage member in the pop-up operation is schematically shown.

The outer wall portion 12 of the hinge lower 10 is rotatably connected to the one end portion (rear end portion) of the side wall portion 21 through the axis of rotation X1 extending in the vehicle width direction. The link member 40 is rotatably connected at the longitudinally middle portion of the side wall portion 21 through an axis of rotation X2 extending in the vehicle width direction. Formed on the longitudinally middle portion of the side wall portion 21 is a pin portion 21a protruding outward in the vehicle width direction. The pin portion 21a is an example of a second engaged portion with which the second lock 60 is engageable. It should be noted that although the pin portion 21a is provided under an axis of rotation X5 in this embodiment, the pin portion 21a may be coaxial with the axis of rotation X2. As seen in FIGS. 8 and 9, an opening 21b is formed in the other end portion (front end portion) of the side wall portion 21. The opening 21b is an example of a third engaged portion with which a claw portion 42a of the linkage member 40 is engageable.

The front wall portion 22 is an example of a first engaged portion with which the first lock 50 is engageable. Formed in a proximal portion of the upper wall portion 23 is a channel-shaped notch 23a having an open front end. The notch 23a is an example of a fourth engaged portion with which the linkage member 40 is engageable. The rear wall portion 24 contacts the outer wall portion 12 of the hinge lower 10 in the normally opening operation to restrict a rotation range of the hinge upper 5 around the axis of rotation X1.

<Second Member>

The second member 30 is disposed on the other end portion (front end portion) of the first member 20. The second member 30 integrally includes a side wall portion 31 constituting a main part of the second member 30, an upper wall portion 32 extending inward in the vehicle width direction from an upper end portion of the side wall portion 31 and serving as an attachment portion, and a lower wall portion 33 extending outward in the vehicle width direction from a lower end portion of a laterally middle portion of the side wall portion 31.

The one end portion (rear end portion) of the side wall portion 31 is disposed laterally outward of the side wall portion 21 of the first member 20 in the vehicle width direction at the upper portion of the other end portion (front end portion) of the side wall portion 21. The second lock 60 is rotatably connected at the one end portion (rear end portion) of the side wall portion 31 through the axis of rotation X5 extending in the vehicle width direction. The linkage member 40 is rotatably connected to the longitudinally middle portion of the side wall portion 31 through an axis of rotation X3 extending in the vehicle width direction.

The upper wall portion 32 is fixed to a bottom surface of the hood 2, for example, by tightening bolts. The upper wall portion 32 has an opening 32a into which an upper end portion of the linkage member 40 is insertable.

The lower wall portion 33 serves as a third slide portion on which a tip end portion 4a of the actuator 4 abuts and slides. The lower wall portion 33 includes a rear slanted wall portion 33a and a front slanted wall portion 33b. The rear slanted wall portion 33a is inclined downward in the rearward direction from the longitudinally middle portion of the lower wall portion 33. The front slanted wall portion 33b is inclined downward in the frontward direction from the longitudinally middle portion of the lower wall portion 33. The lower wall portion 33 has a channel-shaped opening 33c formed to extend over the rear slanted wall portion 33b and the one end portion (rear end portion) of the front slanted wall portion 33b.

<Linkage Member>

As seen in FIG. 9, the linkage member 40 is disposed laterally inward of the first member 20 and the second member 30 in the vehicle width direction and configured to connect the first member 20 and the second member 30 so as to enable relative movement relative to each other. The linkage member 40 integrally includes a side wall portion 41 constituting a main part of the linkage member 40, and a bifurcated wall portion 42 extending in an obliquely rearward and downward direction from a lower end portion of a laterally middle portion of the side wall portion 41.

The first member 20 is rotatably connected to one end portion (rear end portion or lower end portion in the popped-up state) of the side wall portion 41 through the axis of rotation X2 extending in the vehicle width direction. The second member 30 is rotatably connected to the other end portion (front end portion or upper end portion in the popped-up state) of the side wall portion 41 through the axis of rotation X3 extending in the vehicle width direction. The upper end portion of the side wall portion 41 is an example of a fourth engagement portion engageable with the notch 23a.

A distal end portion (rear end portion) of the bifurcated wall portion 42 has a claw portion 42a extending outward in the vehicle width direction. The claw portion 42a is an example of a third engagement portion engageable with the opening 21b of the first member 20 (see FIGS. 8 and 9).

<First Lock>

As seen in FIGS. 1 to 3, the first lock 50 is disposed laterally outward of the hinge lower 10 in the vehicle width direction. The first lock 50 is a metal member configured to switch between the state (unlocked state) in which the first member 20 is rotatable relative to the hinge lower 10 and the state (locked state) in which the first member 20 is not rotatable relative to the hinge lower 10. The first lock 50 integrally includes a side wall portion 51, a rear wall portion 52 extending laterally outward in the vehicle width direction from one end portion (rear end portion) of the side wall portion 51, and an upper wall portion 53 extending frontward from an upper end portion of the rear wall portion 52. Further, the first lock 50 integrally includes a bifurcated claw portion 54 extending upward from the other end portion (front end portion) of the side wall portion 51.

The side wall portion 51 is provided at a position same as that of the linkage member 40 in the vehicle width direction and also at a position laterally inward in the vehicle width direction of the side wall portion 21 of the first member 20 and the side wall portion 31 of the second member 30. The one end portion (rear end portion) of the side wall portion 51 is rotatably connected to the outer wall portion 12 of the hinge lower 10 through an axis of rotation X4 extending in the vehicle width direction. Further, the side wall portion 51 is temporarily engaged with the outer wall portion 12 of the hinge lower 10 by a pin P made of plastic resin or metal. The upper wall portion 53 is an example of a first slide portion on which the tip end portion 4a of the actuator 4 abuts and slide. The bifurcated claw portion 54 is an example of a first engagement portion engageable with the front wall portion 22 of the first member 20.

<Second Lock>

The second lock 60 is disposed laterally outward of the second member 30 in the vehicle width direction. The second lock 60 is a metal member configured to switch between the state (locked state) in which the first member 20 and the second member 30 are not relatively movable relative to each other and the state (unlocked state) in which the first member 20 and the second member 30 are relatively movable relative to each other. The second lock 60 integrally includes a side wall portion 61, and a bifurcated claw portion 62 extending in an obliquely rearward and downward direction from a lower end portion of a laterally middle portion of the side wall portion 61.

The one end portion (rear end portion) of the side wall portion 61 is rotatably connected to the side wall portion 31 of the second member 30 through the axis of rotation X5 extending in the vehicle width direction. The other end portion (front end portion) 61a of the side wall portion 61 serves as a second slide portion on which the tip end portion 4a of the actuator 4 abuts and slides. The bifurcated claw portion 62 has a curved shape extending to wrap around the pin portion 21a from the front side to the lower side of the pin portion 21a (from an imaginary line extending along the axis of the actuator 4 to the opposite side of the axis of rotation X5). The bifurcated claw portion 62 is an example of a second engagement portion engageable with the pin portion 21a. The diameter of the bifurcated claw portion 62 at its portion contacting the pin portion 21a is preferably smaller than the diameter of the pin portion 21a at its portion (outer peripheral surface) contacting the bifurcated claw portion 62. Further, the distance from the other end portion (second slide portion) 61a to the axis of rotation X5 is longer than the distance from the portion at which the bifurcated claw portion 62 contacts the pin portion 21a to the axis of rotation X5. This configuration makes it possible to move (rotate) the second lock 60 with a small contact force.

<Operation>

Operation of the vehicle hood hinge 1 will be described below in the order of the closed state, the normally opening operation, and the pop-up operation.

<Closed State>

In the closed state, as seen in FIG. 1, the upper wall portion 23 of the first member 20 is placed on the outer wall portion 12 of the hinge lower 10. Further, the upper wall portion 32 of the second member 30 is placed on the side wall portion 41 of the linkage member 40. It should be noted that a portion of the side wall portion 41 is inserted into the opening 32a from the lower side thereof. Further, the bifurcated claw portion 62 of the second lock 60 engages with the pin portion 21a. By this engagement, the second member 30 is locked (in the locked state) to inhibit relative movement relative to the first member 20. In this locked state, the hinge lower 10 rotatably supports the first member 20, the second member 30, and the linkage member 40, as a single assembly of the hinge upper 5, around the axis of rotation X1.

It should be noted that the bifurcated claw portion 54 of the first lock 50 is spaced apart from the front wall portion 22 of the first member 20 (i.e., in the unlocked state). The other end portion (front end portion) 61a of the side wall portion 61 of the second lock 60 is inserted into the opening 33c of the second member 30 from the upper side thereof. Further, the claw portion 42a of the linkage member 40 is spaced apart from the opening 21b (i.e., in the unlocked state).

<Normally Opening Operation>

Figure 4:
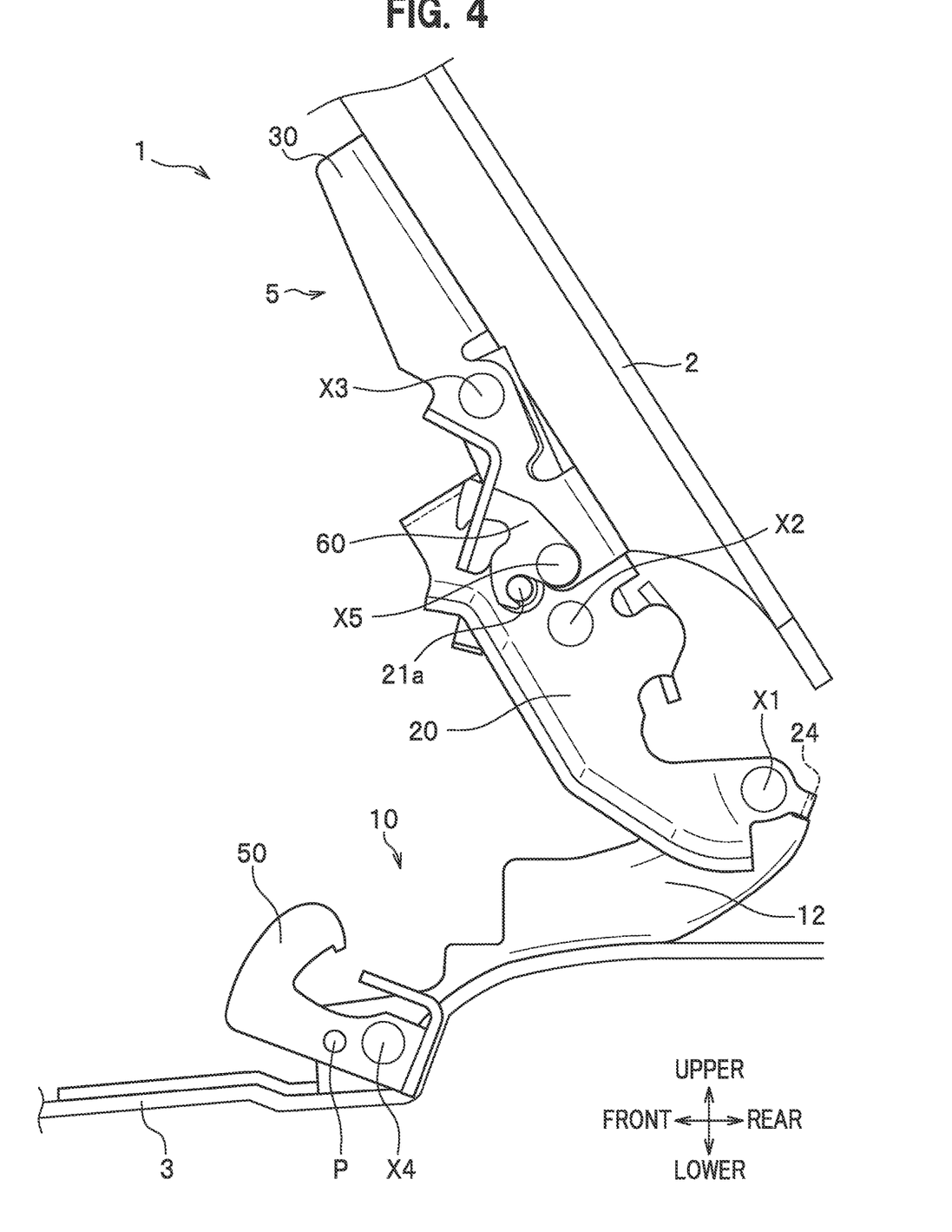
FIG. 4 is a side view explaining motion of the hinge, in which a normally opened state of the hinge is schematically shown.

As seen in FIG. 4, when the hood 2 is opened in the normally opening operation, the other end portion (front end portion) of the hood 2 is lifted up by an operator. The hinge upper 5 is then caused to rotate around the axis of rotation X1 in an opening direction relative to the hinge lower 10. In other words, the hood 2 is configured to be openable and closable with the one end portion (rear end portion) of the hood 2 serving as the axis of rotation X1. The rear wall portion 24 of the first member 20 comes into contact with the upper end portion of the outer wall portion 12 of the hinge lower 10, so that the rotation range of the hood 2 is restricted.

<Pop-Up Operation>

<<Locking of the First Lock to the First Member Using the Actuator>>

Figure 5:
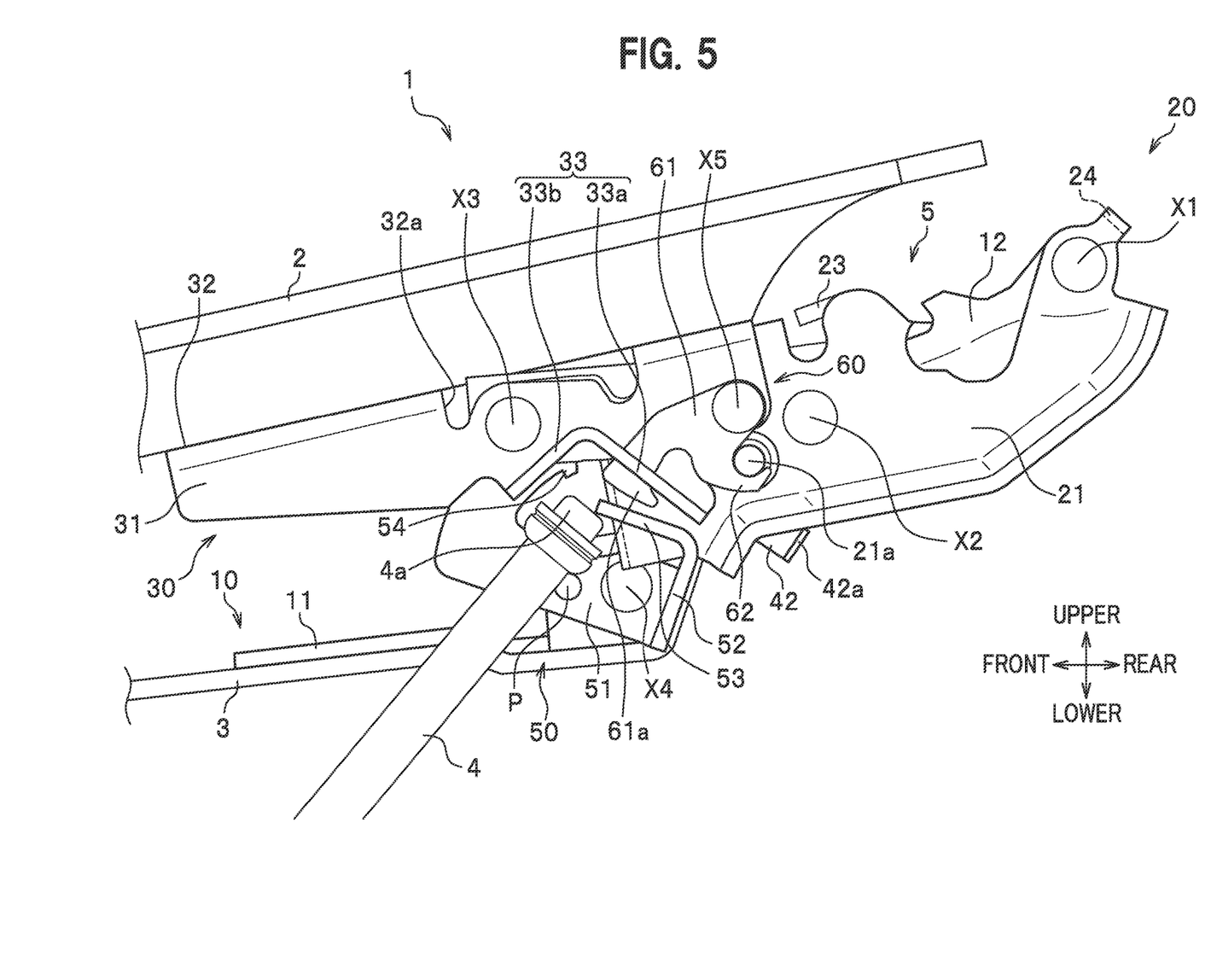
FIG. 5 is a side view explaining motion of the hinge, in which a locking motion of a first member in a pop-up operation is schematically shown.
Figure 6:
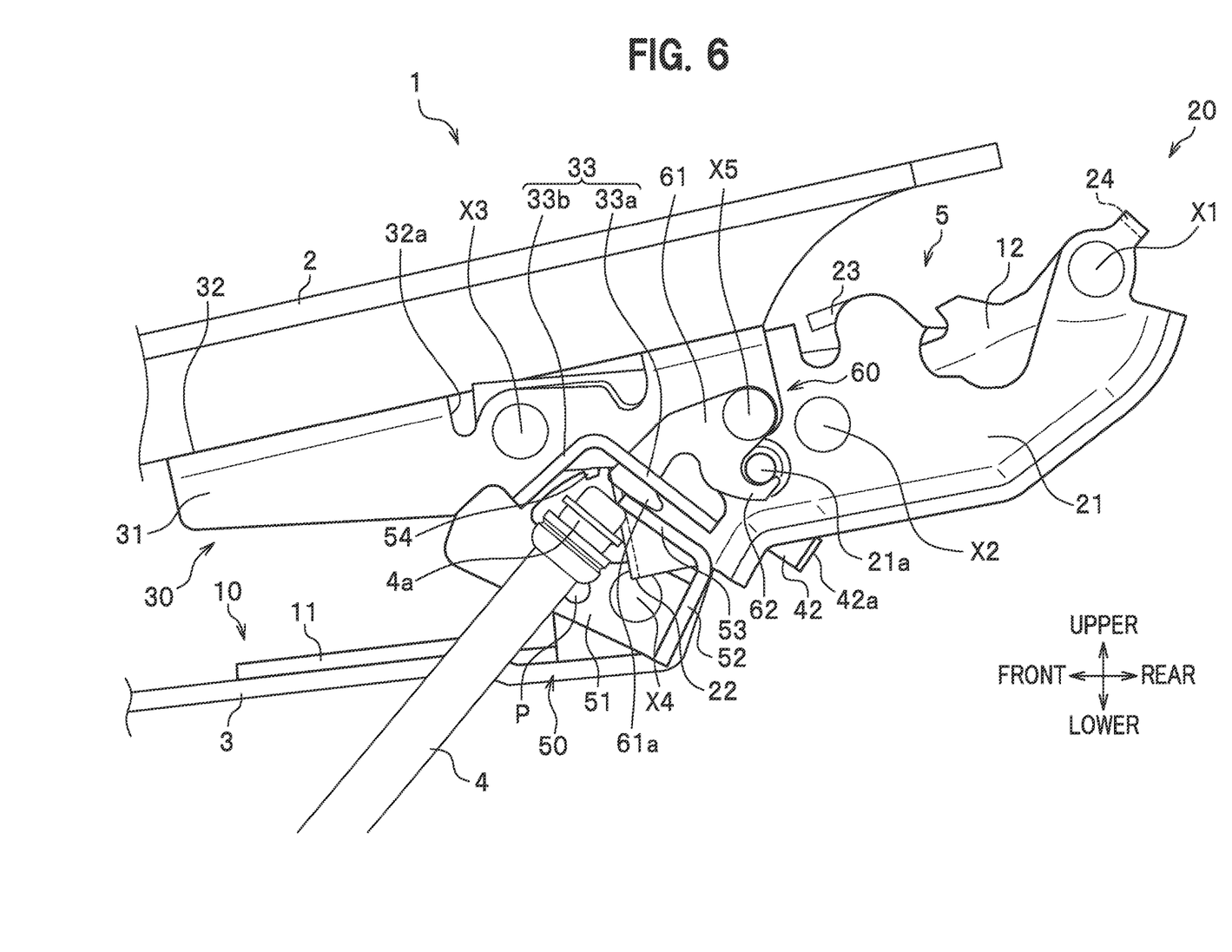
FIG. 6 is a side view explaining motion of the hinge, in which the locking motion of the first member in the pop-up operation is schematically shown.

In the closed state, as seen in FIG. 5, the upper wall portion (first slide portion) 53 of the first lock 50, the other end portion (second slide portion) 61a of the second lock 60, and the lower wall portion (third slide portion) 33 (more specifically, rear slanted wall portion 33a) of the second member 30 are aligned in this order in the extension direction of the actuator 4. Further, the axes of rotation X2, X4, X5, the pin portion 21a, and the bifurcated claw portion 62 are disposed at one side (rear side) of the axis of the actuator 4, whereas the axis of rotation X3, the front wall portion 22, and the bifurcated claw portion 54 are disposed at the other side (front side) of the axis of the actuator 4. As seen in FIGS. 5 and 6, when the hood 2 is caused to pop up in the pop-up operation, the tip end portion 4a of the actuator 4 pushes the upper wall portion 53 of the first lock 50 from the lower side thereof. The first lock 50 becomes rotatable around the axis of rotation X4 when the pin P is disengaged, and the tip end portion 4a of the actuator 4 slides on the lower surface of the upper wall portion 53. This causes the first lock 50 to rotate around the axis of rotation X4, so that the bifurcated claw portion 54 is brought into engagement (locked state) with the upper end portion of the front wall portion 22 of the first member 20. In this locked state, the first member 20 is not rotatable around the axis of rotation X1 relative to the hinge lower 10.

<<Unlocking of the Second Lock from the First Member Using the Actuator>>

Figure 7:
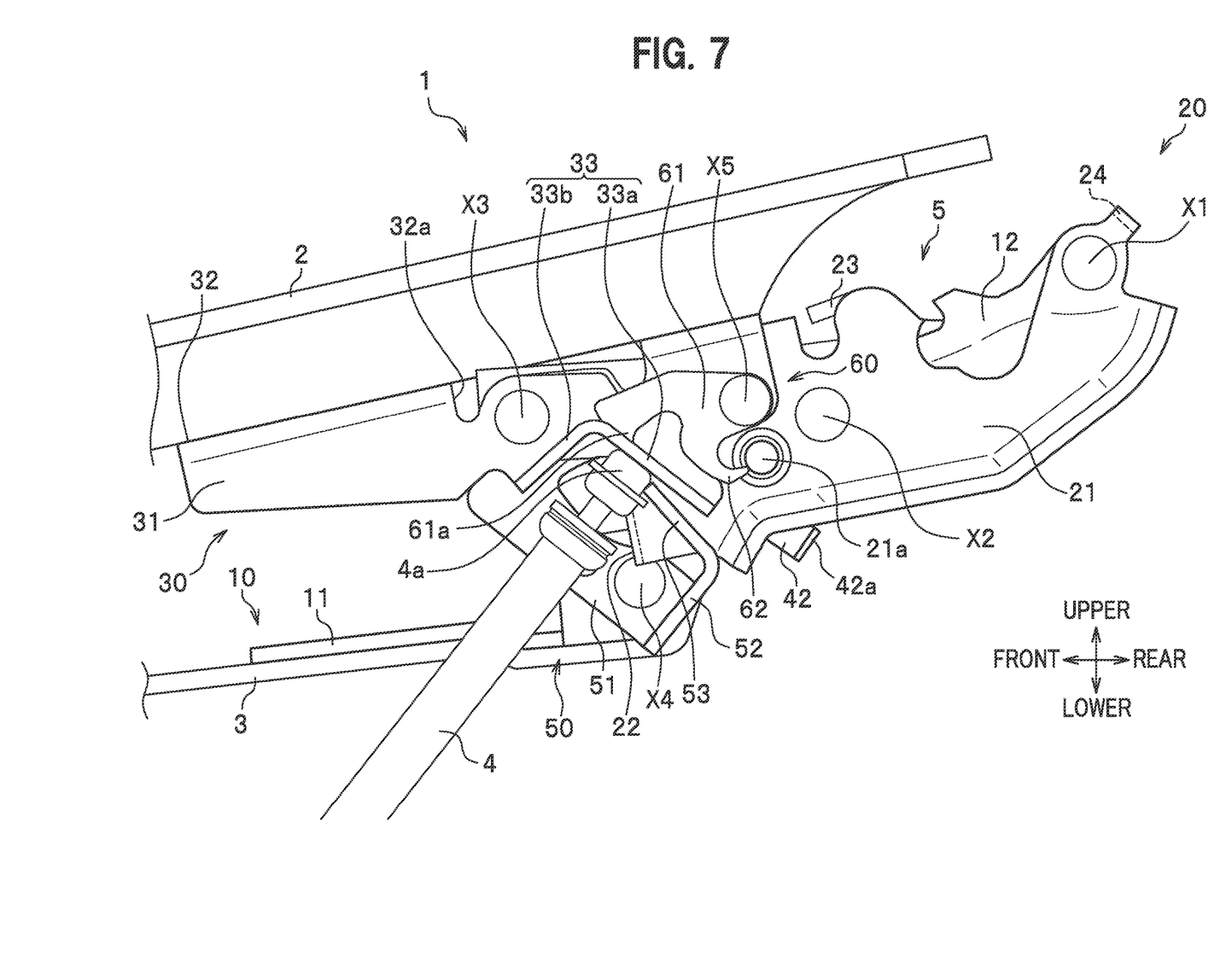
FIG. 7 is a side view explaining motion of the hinge, in which an unlocking motion of a second member in the pop-up operation is schematically shown.

Subsequently, as seen in FIGS. 6 and 7, the tip end portion 4a of the actuator 4 is disengaged from the upper wall portion 53 of the first lock 50, and then pushes the other end portion (front end portion) 61a of the side wall portion 61 of the second lock 60 from the lower side thereof. At this time, the tip end portion 4a of the actuator 4 slides on the front surface of the other end portion 61a of the side wall portion 61. This causes the second lock 60 to rotate around the axis of rotation X5, so that the bifurcated claw portion 62 is disengaged (in the unlocked state) from the pin portion 21a of the side wall portion 21 of the first member 20. In this unlocked state, the second member 30 is relatively movable in the upward direction relative to the first member 20.

<<Locking of the Linkage Member to the First Member Using the Actuator>>

Subsequently, as seen in FIGS. 8 and 9, the tip end portion 4a of the actuator 4 disengages from the other end portion 61a of the side wall portion 61 of the second lock 60, and then pushes the lower wall portion 33 of the second member 30 from the lower side thereof. At this time, the tip end portion 4a of the actuator 4 slides on the lower surface of the rear slanted wall portion 33a of the lower wall portion 33 while a part of the tip end portion 4a is inserted into the opening 33c. During this sliding motion, the front slanted wall portion 33b prevents the tip end portion 4a of the actuator 4 from coming off the front side (upper side) of the rear slanted wall portion 33a. This can cause the linkage member 40 to rotate around the axis of rotation X2 relative to the first member 20 and to rotate around the axis of rotation X3 relative to the second member 30. In other words, the second member 30 relatively moves upward (and slightly rearward) relative to the first member 20.

A middle portion of the linkage member 40 contacts the upper wall portion 23 of the first member 20, and the claw portion 42a of the linkage member 40 is inserted into the opening 21b of the first member 20. To be more specific, the middle portion of the linkage member 40 is inserted into the notch 23a and brought into contact with the bottom portion (one end portion or front end portion) of the notch 23a, to thereby restrict a rotation in the clockwise direction of FIGS. 8 and 9. Further, the claw portion 42a of the linkage member 40 is inserted into the opening 21b of the first member 20, to thereby restrict a rotation (in particular, rotation in the counterclockwise direction of FIGS. 8 and 9). Accordingly, the hinge 1 holds the one end portion (rear end portion) of the hood 2 at a predetermined height.

The hinge 1 takes a posture such that in the popped-up state, the linkage member 40 extends substantially in the vertical direction (i.e., the axis of rotation X3 is positioned right above the axis of rotation X2). Accordingly, the rear end portion of the hood 2 can be supported in a suitable manner.

<Modifications of the Pin Portion>

Figure 10:
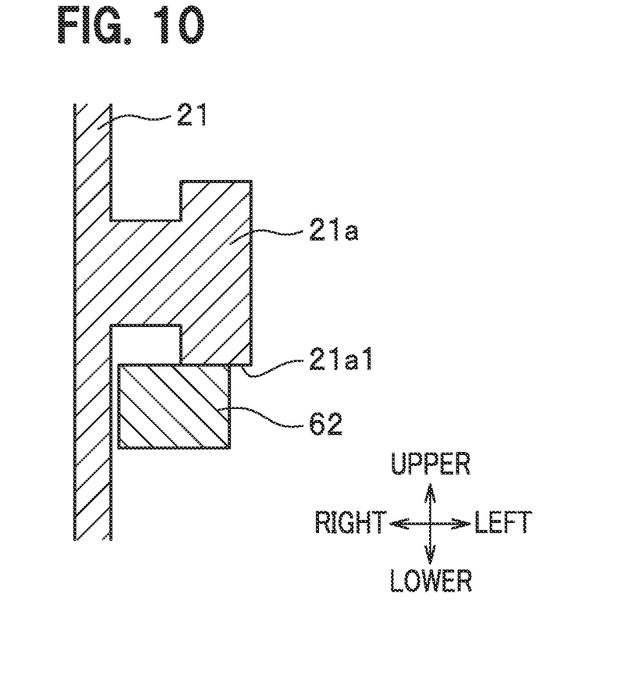
FIG. 10 is a sectional view schematically showing a pin portion according to a modified embodiment.

Modified embodiments of the pin portion 21a will be described below. As seen in FIG. 10, asperities (recess or projection) 21a1 may be formed on the outer peripheral surface of the pin portion 21a at which the bifurcated claw portion 62 contacts. With this configuration, the area of the pin portion 21a with which the bifurcated claw portion 62 engages can be decreased, to thereby enhance the engagement pressure and to improve the locking property. According to the embodiment shown in FIG. 10, the pin portion 21a has a radially recessed portion formed at its proximal portion in the axial direction of the pin portion 21a (the pin portion 21a has a radially protruding portion formed on the distal portion in the axial direction of the pin portion 21a). However, the recess and/or projection may be arranged in line along the circumferential direction of the pin portion 21a.

Figure 11:
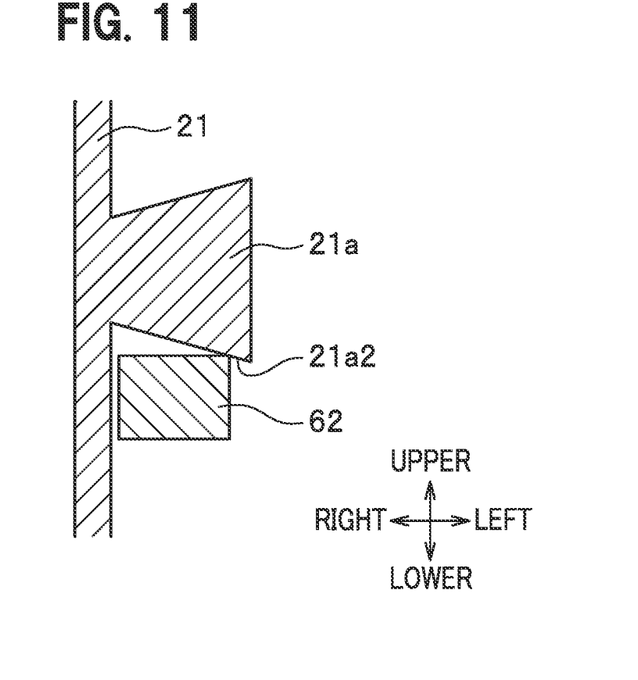
FIG. 11 is a sectional view schematically showing the pin portion according to another modified embodiment.

Further, as seen in FIG. 11, a tapered surface 21a2 (i.e., the diameter of the pin portion 21a changes in the axial direction of the pin portion 21a) may be formed on the outer peripheral surface of the pin portion 21a at which the bifurcated claw portion 62 contacts. With this configuration, the area of the pin portion 21a with which the bifurcated claw portion 62 engages can be decreased, to thereby enhance the engagement pressure and to improve the locking property. According to the embodiment shown in FIG. 11, the tapered surface 21a2 is formed such that the diameter thereof increases with the increasing distance toward the axially distal end portion of the pin portion 21a. However, the tapered surface 21a2 may be formed such that the diameter thereof decreases with the increasing distance toward the axially distal end portion of the pin portion 21a.

The vehicle hood hinge 1 according to this embodiment includes the hinge lower 10 fixed to the vehicle body 3, and the hinge upper 5 fixed to the hood 2 and configured to be rotatably supported relative to the hinge lower 10. The hinge upper 5 includes the first member 20 rotatably supported relative to the hinge lower 10, and the second member 30 fixed to the hood 2 and configured to be supported so as to be relatively movable relative to the first member 20. The hinge 1 further includes the first lock 50 configured to be engageable with the first member 20 to restrict rotation of the first member 20 relative to the hinge lower 10. The first member 20 and the second member 30 are integrally rotatable relative to the hinge lower 10 in the normal operation of opening and closing the hood 2. Whereas when the hood 2 is caused to pop up, the first lock 50 engages with the first member 20 and the second member 30 is relatively movable relative to the first member 20.

With this configuration of the hinge 1, since in the pop-up operation the second member 30 of the hinge upper 5 is lifted up and the first member 20 is not lifted up, it is possible to suppress the weight of the members to be lifted up, so that a smaller force is required to lift up the second member 30 and the hood 2. For example, when the actuator 4 is used to lift up the hood 2 in the pop-up operation, the output and the size of the actuator 4 can be reduced and the layout of the windshield of the vehicle can be improved (as a result of space saving design and improved design flexibility).

Further, the vehicle hood hinge 1 according to this embodiment is configured such that one end portion of the first member 20 is rotatably supported relative to the hinge lower 10 and that the first lock 50 is engageable with the other end portion of the first member 20.

With this configuration of the hinge 1, since the first lock 50 engages with the first member 20 at the opposite side of the axis of rotation, the first member 20 can be locked more firmly.

Further, the vehicle hood hinge 1 according to this embodiment is configured such that the actuator 4 relatively moves the second member 30 relative to the first member 20 when the hood 2 is caused to pop up, that the first lock 50 has the first slide portion (lower wall portion 33) on which the actuator 4 abuts and slides, and that when the hood 2 is caused to pop up, the actuator 4 pushes the first slide portion of the first lock 50 so that the first lock 50 is brought into engagement with the first member 20.

With this configuration of the hinge 1, the number of parts can be reduced because the first lock 50 is engaged and the second member 30 is pushed up during the pop-up operation by using the only one actuator 4.

Further, the vehicle hood hinge 1 according to this embodiment further includes the second lock 60 provided on one of the first member 20 and the second member 30, and the second lock 60 has the second slide portion (other end portion 61a) on which the actuator 4 abuts and slides. In the normal operation of opening and closing the hood 2, the second lock 60 engages with the other one of the first member 20 and the second member 30 to inhibit relative movement between the first member 20 and the second member 30. When the hood 2 is caused to pop up, the actuator 4 pushes the second slide portion of the second lock 60 to disengage the second lock 60 from the other one of the first member 20 and the second member 30.

With this simple structure and operation of the hinge 1 as to whether or not the second lock 60 is brought into engagement, the first member 20 and the second member 30 are integrally rotatable during the normal operation of opening and closing the hood 2, whereas the second member 30 is relatively movable relative to the first member 20 during the pop-up operation of the hood 2. Further, the number of parts can be reduced because the second lock 60 is disengaged during the pop-up operation by using the only one actuator 4.

Further, the vehicle hood hinge 1 according to this embodiment is configured such that the other one of the first member 20 and the second member 30 has the recess or the projection (asperities 21a1) at the position engageable with the second lock 60.

With this configuration of the hinge 1, since the contact area of the engagement portion can be decreased, it is possible to enhance the engagement pressure and to improve the locking property.

Further, the vehicle hood hinge 1 according to this embodiment is configured such that that portion of the other one of the first member 20 and the second member 30 which engages with the second lock 60 is the pin portion 21a and that the diameter of the pin portion 21a changes in the axial direction of the pin portion 21a.

With this configuration of the hinge 1, since the contact area of the engagement portion can be decreased, it is possible to enhance the engagement pressure and to improve the locking property.

The vehicle hood hinge 1 according to this embodiment further includes the linkage member 40 connecting the first member 20 and the second member 30, and the linkage member 40 and one of the first member 20 and the second member 30 by which the linkage member 40 is rotatably supported are engaged with each other when the hood 2 is caused to pop up, to thereby restrict the rotation range of the linkage member 40.

With this configuration, the hinge 1 can reliably hold the hood 2 in the raised state when the hood 2 is popped up.

Although one embodiment of the present invention and some modifications thereof have been described above, the present invention is not limited to the above-described embodiment and various changes and modifications may be made where appropriate without departing from the gist of the present invention. For example, the second lock 60 may be provided on the first member 20, and the pin portion engageable with the second lock 60 may be provided on the second member 30.

Further, the linkage member 40 may be engageable with the second member 30 when the hood 2 is caused to pop up, to thereby restrict the rotation range of the linkage member 40.

What is claimed is:

1. A hinge for a hood of a vehicle, the hinge comprising:
   a hinge lower fixed to a vehicle body; and
   a hinge upper fixed to the hood and configured to be rotatably supported relative to the hinge lower,
   wherein the hinge upper comprises:
      a first member rotatably supported relative to the hinge lower; and
      a second member fixed to the hood and configured to be supported so as to be relatively movable relative to the first member,
   wherein the hinge further comprises:
      a first lock configured to be engageable with the first member to restrict rotation of the first member relative to the hinge lower,
      a second lock provided on the second member, and
      a linkage member connecting the first member and the second member,
   wherein an actuator relatively moves the second member relative to the first member when the hood is caused to pop up,
   wherein the first lock has a first slide portion on which the actuator abuts and slides,
   wherein the second lock has a second slide portion on which the actuator abuts and slides,
   wherein in the normal operation of opening and closing the hood, the second lock engages with the first member to inhibit relative movement between the first member and the second member, so that the first member and the second member are integrally rotatable relative to the hinge lower,
   wherein when the hood is caused to pop up, the actuator pushes the second slide portion of the second lock to disengage the second lock from the first member and the actuator pushes the first slide portion of the first lock, so that the first lock engages with the first member and the second member is relatively movable relative to the first member, and
   wherein when the hood is caused to pop up, a claw portion formed on the linkage member is inserted into an opening formed in the first member by which the linkage member is rotatably supported, so that the linkage member and the first member are engaged with each other to thereby restrict a rotation range of the linkage member.

2. The hinge according to claim 1, wherein one end portion of the first member is rotatably supported relative to the hinge lower, and
   wherein the first lock is engageable with another end portion of the first member.

3. The hinge according to claim 1, wherein the other one of the first member and the second member has a recess or a projection at a position engageable with the second lock.

4. The hinge according to claim 1, wherein that portion of the other one of the first member and the second member which engages with the second lock is a pin portion, and
   wherein a diameter of the pin portion changes in an axial direction of the pin portion.

* * * * *